US009009035B2

(12) United States Patent
Tsujikawa et al.

(10) Patent No.: US 9,009,035 B2
(45) **Date of Patent: *Apr. 14, 2015**

(54) METHOD FOR PROCESSING MULTICHANNEL ACOUSTIC SIGNAL, SYSTEM THEREFOR, AND PROGRAM

(75) Inventors: Masanori Tsujikawa, Tokyo (JP); Ryosuke Isotani, Tokyo (JP); Tadashi Emori, Tokyo (JP); Yoshifumi Onishi, Tokyo (JP)

(73) Assignee: NEC Corporation, Tokyo (JP)

( * ) Notice: Subject to any disclaimer, the term of this patent is extended or adjusted under 35 U.S.C. 154(b) by 311 days.

This patent is subject to a terminal disclaimer.

(21) Appl. No.: 13/201,354

(22) PCT Filed: Feb. 8, 2010

(86) PCT No.: PCT/JP2010/051751

§ 371 (c)(1), (2), (4) Date: Oct. 3, 2011

(87) PCT Pub. No.: WO2010/092914

PCT Pub. Date: Aug. 19, 2010

(65) Prior Publication Data

US 2012/0029915 A1 Feb. 2, 2012

(30) Foreign Application Priority Data

Feb. 13, 2009 (JP) ................................ 2009-031110

(51) Int. Cl.

*G10L 21/02* (2013.01)
*H04B 15/00* (2006.01)
*G10L 21/0272* (2013.01)

(52) U.S. Cl.

CPC ................................ *G10L 21/0272* (2013.01)

(58) Field of Classification Search

USPC ................................ 704/226, 200, 218, 236

See application file for complete search history.

(56) References Cited

U.S. PATENT DOCUMENTS 4,486,793 A * 12/1984 Todd ................................ 360/30
4,649,505 A * 3/1987 Zinser et al. ............ 379/406.08

(Continued)

FOREIGN PATENT DOCUMENTS

JP 2005-195955 A 7/2005
JP 2005-308771 A 11/2005

(Continued)

OTHER PUBLICATIONS

Wrigley, Brown, Wan and Renals, Speech and Crosstalk Detection in Multichannel Audio, IEEE Transactions on Speech and Audio Processing, pp. 84-91, vol. 13, No. 1, Jan. 2005.*

(Continued)

*Primary Examiner* — Brian Albertalli

(74) *Attorney, Agent, or Firm* — Sughrue Mion, PLLC

(57) ABSTRACT

A method for processing multichannel acoustic signals which processes input signals of a plurality of channels including the voices of a plurality of speaking persons. The method is characterized by detecting the voice section of each speaking person or each channel, detecting overlapped sections wherein the detected voice sections are common between channels, determining a channel to be subjected to crosstalk removal and the section thereof by use of at least voice sections not including the detected overlapped sections, and removing crosstalk in the sections of the channel to be subjected to the crosstalk removal.

21 Claims, 7 Drawing Sheets

(56) References Cited

U.S. PATENT DOCUMENTS

| | | | | |
|---|---|---|---|---|
| 5,208,786 | A * | 5/1993 | Weinstein et al. | 367/124 |
| 6,320,918 | B1 * | 11/2001 | Walker et al. | 375/346 |
| 6,771,779 | B1 * | 8/2004 | Eriksson et al. | 381/20 |
| 2001/0048740 | A1 * | 12/2001 | Zhang et al. | 379/406.01 |
| 2004/0213146 | A1 * | 10/2004 | Jones et al. | 370/210 |
| 2005/0152563 | A1 | 7/2005 | Amada et al. | |

FOREIGN PATENT DOCUMENTS

| | | | |
|---|---|---|---|
| JP | 2008-309856 | A | 12/2008 |
| JP | 2009-020460 | A | 1/2009 |

OTHER PUBLICATIONS

Pfau, Ellis, and Stolcke, Multispeaker Speech Activity Detection for the ICSI Meeting Recorder, Proceedings IEEE Automatic Speech Recognition and Understanding Workshop, Madonna di Campiglio, 2001.*

Jin, Laskowski, Schultz, and Waibel, Speaker Segmentation and Clustering in Meetings, Proceedings of the 8th International Conference on Spoken Language Processing, Jeju Island, Korea, 2004.*

* cited by examiner

METHOD FOR PROCESSING MULTICHANNEL ACOUSTIC SIGNAL, SYSTEM THEREFOR, AND PROGRAM

CROSS REFERENCE TO RELATED APPLICATIONS

This application is a National Stage of International Application No. PCT/JP2010/051751 filed Feb. 8, 2010 claiming priority based on Japanese Patent Application No. 2009-031110 filed Feb. 13, 2009, the contents of all of which are incorporated herein by reference in their entirety.

TECHNICAL FIELD

The present invention relates to a multichannel acoustic signal processing method, a system therefor, and a program.

BACKGROUND ART

One example of the related multichannel acoustic signal processing system is described in Patent literature 1. This system is a system for extracting objective voices by removing out-of-object voices and background noise from mixed acoustic signals of voices and noise of a plurality of talkers collected by a plurality of microphones arbitrarily arranged. Further, the above system is a system capable of detecting the objective voices from the above-mentioned mixed acoustic signals.

FIG. 8 is a block diagram illustrating a configuration of the noise removal system disclosed in the Patent literature 1. A configuration and an operation of a point of detecting the objective voices from the mixed acoustic signals in the above noise removal system will be explained schematically. The system includes a signal separator 101 that receives and separates input time series signals of a plurality of channels, a noise estimator 102 that receives the separated signals to be outputted from the signal separator 101, and estimates the noise based upon an intensity ratio coming from an intensity ratio calculator 106, and a noise section detector 103 that receives the separated signals to be outputted from the signal separator 101, noise components estimated by the noise estimator 102, and an output of the intensity ratio calculator 106, and detects a noise section/a voice section.

CITATION LIST

Patent Literature

PTL 1: JP-P2005-308771A (FIG. 1)

SUMMARY OF INVENTION

Technical Problem

While the noise removal system described in the Patent literature 1 aims for detecting and extracting the objective voices from the mixed acoustic signals of voices and noise of a plurality of the talkers collected by a plurality of the microphones arbitrarily arranged, it includes the following problem.

The above problem is that the objective voices cannot be efficiently detected and extracted from the mixed acoustic signals.

The reason thereof is that the system of the Patent Literature 1 has a configuration of detecting the noise section/the voice section by employing an output of the signal separator 101 for extracting the objective voices. For example, now think about the case of supposing an arrangement of talkers A and B, and microphones A and B as shown in FIG. 1, and detecting and extracting the voices of the talkers A and B from the mixed acoustic signals of the talker A and B collected by the microphones A and B, respectively. The voice of the talker A and that of the talker B mixedly enter the microphone A at an approximately identical ratio because a distance between the microphone A and the talker A is close to a distance between the microphone A and the talker B (see FIG. 2).

However, the voice of the talker A mixedly entering the microphone B is few as compared with the voice of the talker B entering the microphone B because a distance between the microphone B and the talker A is far away as compared with a distance between the microphone B and the talker B (see FIG. 2). That is, in order to extract the voice of the talker A included in the microphone A and the voice of the talker B included in the microphone B, a necessity degree for removing the voice of the talker B mixedly entering the microphone A (crosstalk by the talker B) is high, and a necessity degree for removing the voice of the talker A mixedly entering the microphone B (crosstalk due to the talker A) is low.

Thus, when the necessity degree of the removal differs, it is non-efficient for the signal separator 101 to perform the identical processing for the mixed acoustic signals collected by the microphone A and the mixed acoustic signals collected by the microphone B.

Thereupon, the present invention has been accomplished in consideration of the above-mentioned problems, and an object thereof lies in providing a multichannel acoustic signal processing method capable of efficiently removing crosstalk from the input signals of the multichannel, a system therefor and a program therefor.

Solution to Problem

The present invention for solving the above-mentioned problems is a multichannel acoustic signal processing method of processing input signals of a plurality of channels including voices of a plurality of talkers, comprising: detecting a voice section for each said talker or for each said channel; detecting an overlapped section, being a section in which said detected voice sections are overlapped between the channels: deciding the channel, being a target of crosstalk removal processing, and the section thereof by employing at least the voice section that does not include said detected overlapped section; and removing crosstalk of the section of said channel decided as a target of the crosstalk removal processing.

The present invention for solving the above-mentioned problems is a multichannel acoustic signal processing system for processing input signals of a plurality of channels including voices of a plurality of talkers, comprising: a voice detector that detects a voice section for each said talker or for each said channel; an overlapped section detector that detects an overlapped section, being a section in which said detected voice sections are overlapped between the channels: a crosstalk processing target decider that decides the channel, being a target of crosstalk removal processing, and the section thereof by employing at least the voice section that does not include said detected overlapped section; and a crosstalk remover that removes crosstalk of the section of said channel decided as a target of the crosstalk removal processing.

The present invention for solving the above-mentioned problems is a program for a multichannel acoustic signal process of processing input signals of a plurality of channels including voices of a plurality of talkers, said program causing an information processing device to execute: a voice detecting process of detecting a voice section for each said talker or for each said channel; an overlapped section detecting process of detecting an overlapped section, being a section in which said detected voice sections are overlapped between the channels: a crosstalk processing target deciding process of deciding the channel, being a target of crosstalk removal processing, and the section thereof by employing at least the voice section that does not include said detected overlapped section; and a crosstalk removing process of removing crosstalk of the section of said channel decided as a target of the crosstalk removal processing.

Advantageous Effect of Invention

The present invention makes it possible to efficiently remove the crosstalk because the calculation for removing the crosstalk of which an influence is small can be omitted.

DESCRIPTION OF EMBODIMENTS

The exemplary embodiment of the present invention will be explained in details.

Figure 1:
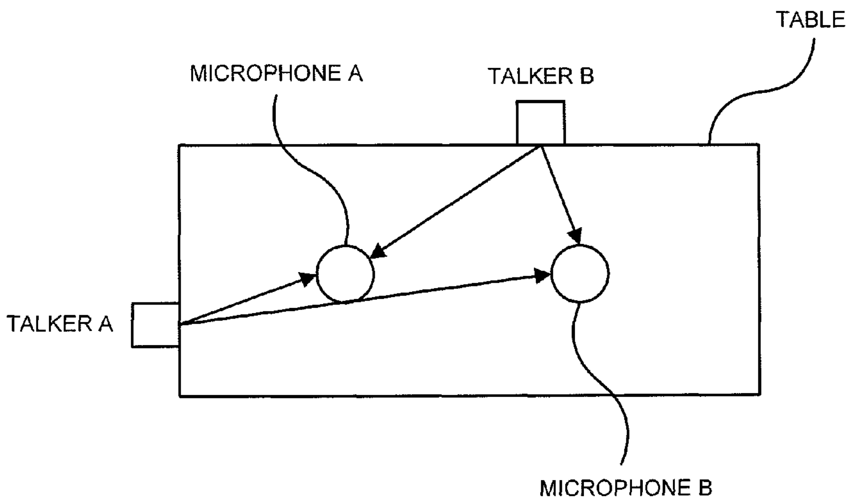
FIG. 1 is an arrangement view of the microphones and the talkers for explaining an object of the present invention.
Figure 2:
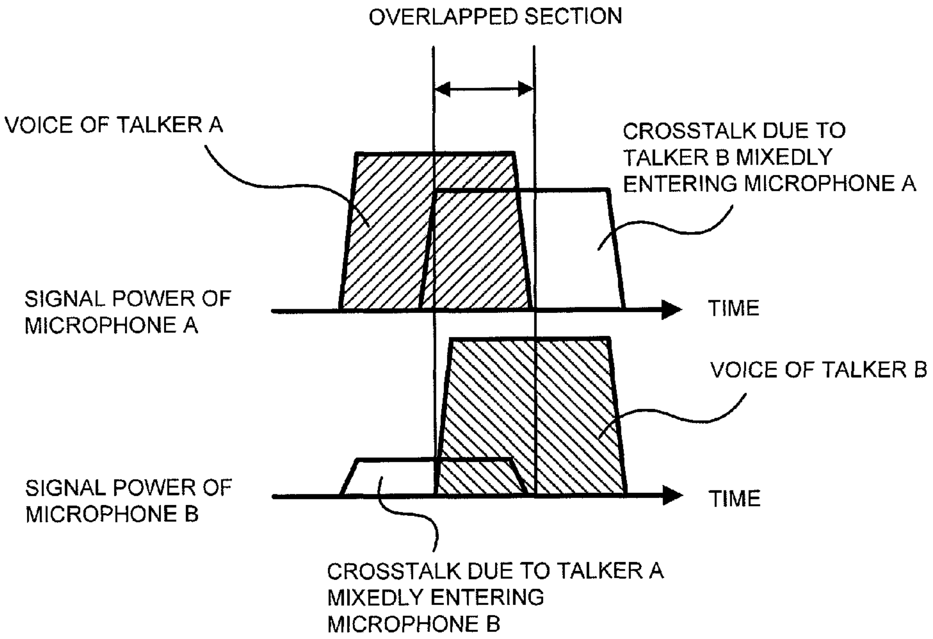
FIG. 2 is a view for explaining the crosstalk and an overlapped section.
Figure 3:
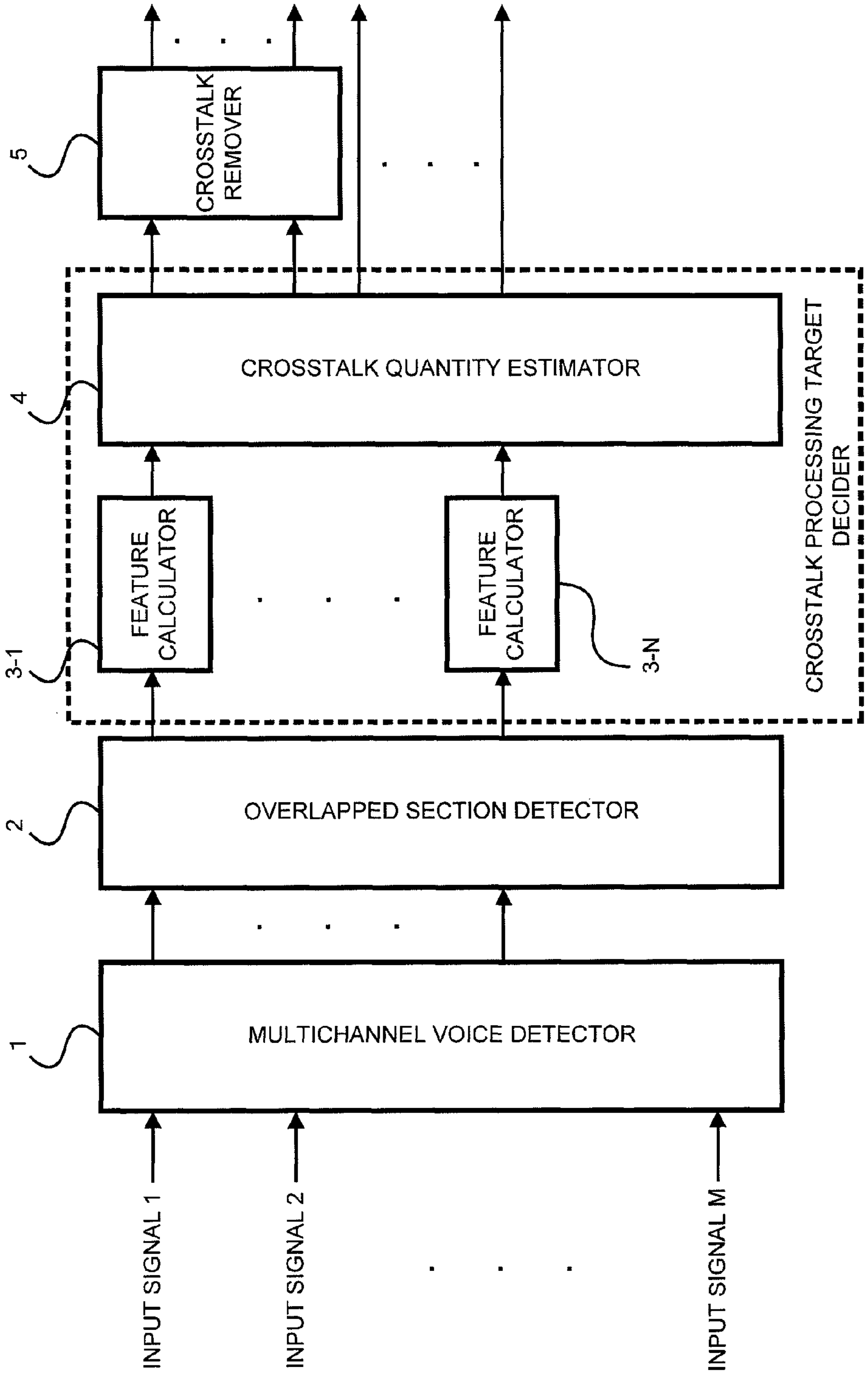
FIG. 3 is a block diagram illustrating a configuration of an exemplary embodiment of the present invention.

FIG. 3 is a block diagram illustrating a configuration example of the multichannel acoustic signal processing system of the present invention. The multichannel acoustic signal processing system exemplified in FIG. 3 includes a multichannel voice detector 1 that receives input signals 1 to M, respectively, and detects the voices of a plurality of the talkers in the input signals of a plurality of the channels with anyone of the channels, respectively, an overlapped section detector 2 that detects the overlapped section of the detected voice sections of a plurality of the talkers, feature calculators 3-1 to 3-N that calculate the feature for each plural channels in which at least the voice has been detected, a crosstalk quantity estimator 4 that receives at least the features of a plurality of the channel in the voice section that does not include the aforementioned overlapped section, and estimates magnitude of an influence of the crosstalk, and a crosstalk remover 5 that removes the crosstalk of which an influence is large.

Figure 4:
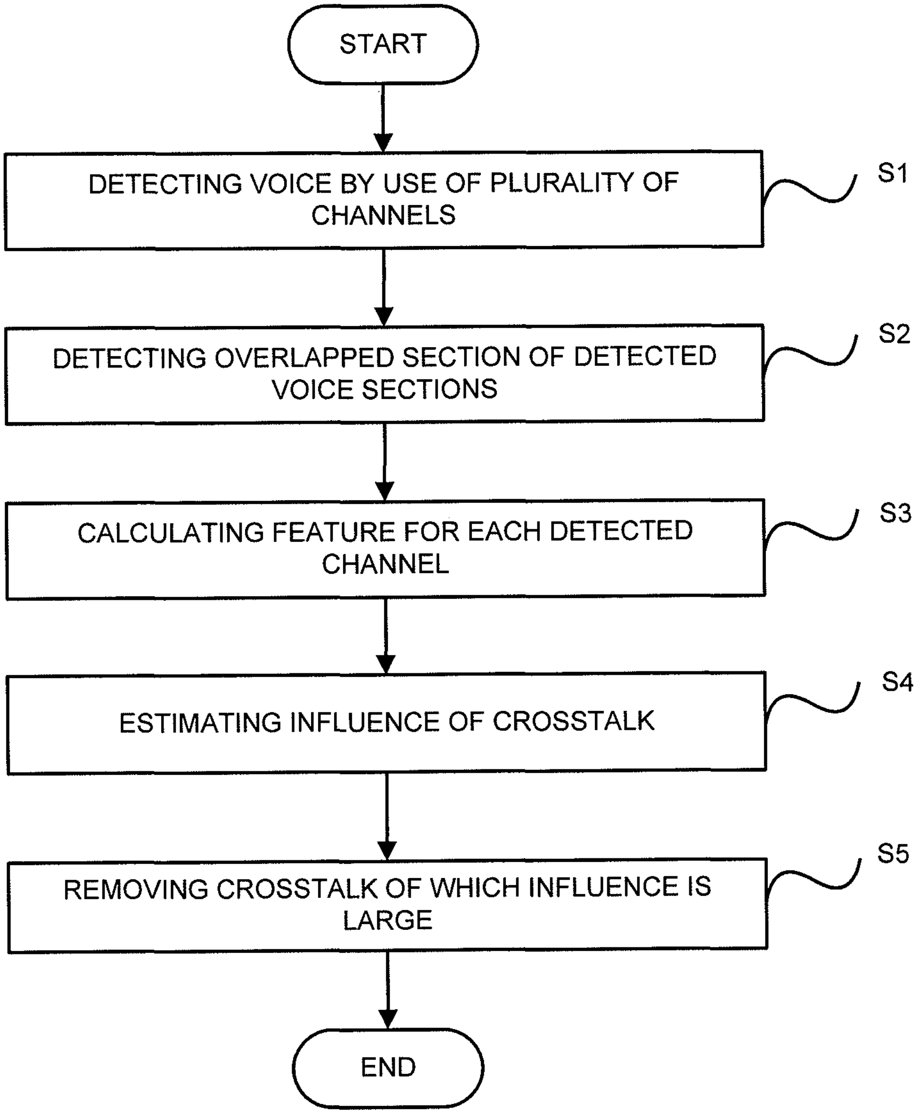
FIG. 4 is a flowchart illustrating an operation of the exemplary embodiment of the present invention.

FIG. 4 is a flowchart illustrating a processing procedure in the multichannel acoustic signal processing system related to the exemplary embodiment of the present invention. The details of the multichannel acoustic signal processing system of this exemplary embodiment will be explained below by making a reference to FIG. 3 and FIG. 4.

It is assumed that the input signals 1 to M are x1(t) to xM(t), respectively. Where, t is an index of time. The multichannel voice detector 1 detects the voices of a plurality of the talkers in the input signals of a plurality of the channels with anyone of the channels from the input signals 1 to M, respectively (step S1). As an example, on the assumption that the different voices have been detected in the channels 1 to N, respectively, the signals of the above voice sections are expressed as follows.

$$x1(ts1-te1)$$
$$x2(ts2-te2)$$
$$x3(ts3-te3)$$
$$\vdots$$
$$xN(tsN-teN)$$

Figure 5:
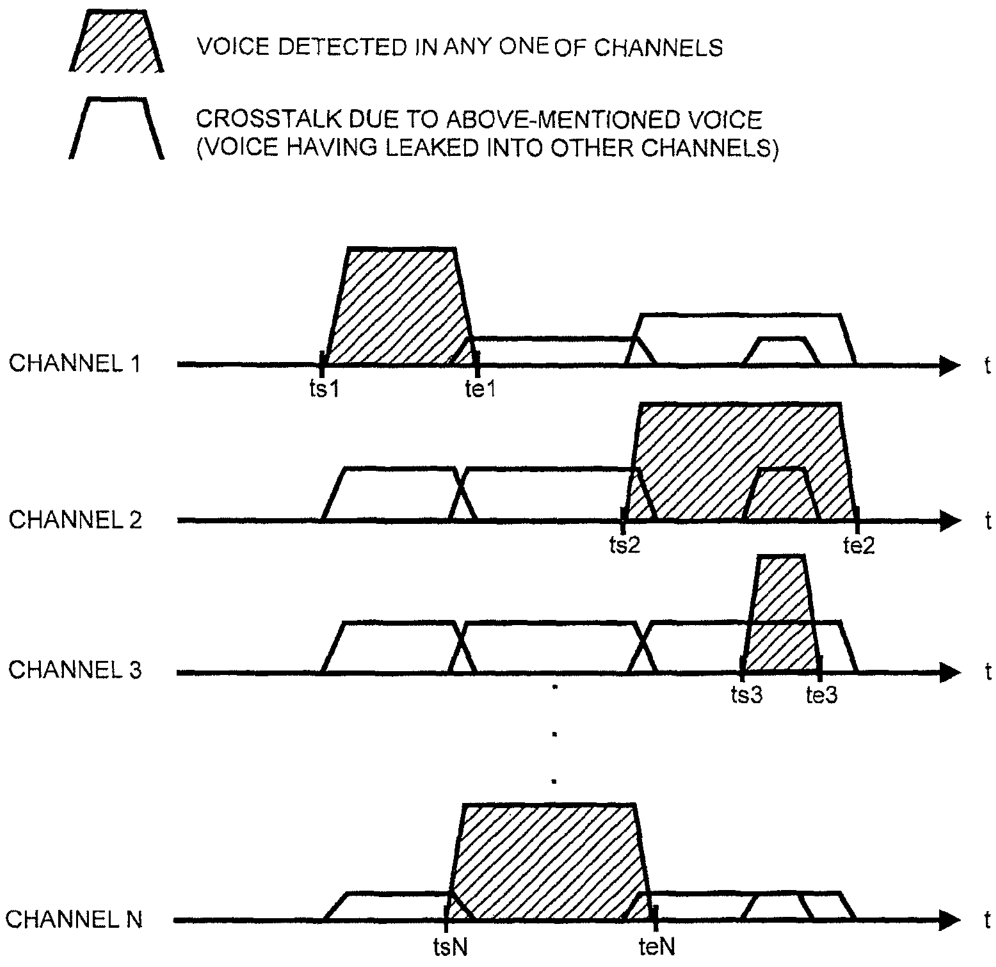
FIG. 5 is a view illustrating the crosstalk between the voice section to be detected by a multichannel voice detector 1 and the channel.

Where, ts1, ts2, ts3, . . . , and tsN are start times of the voice section detected in the channel 1 to N, respectively, and te1, te2, te3, . . . , and teN are end times of the voice section detected in the channel 1 to N, respectively (see FIG. 5).

Additionally, the conventional technique of detecting the voice of the talker by employing a plurality of the input signals may be employed for the multichannel voice detector 1 in some cases, and the voice of the talker may be detected with an ON/OFF signal of a microphone switch caused to correspond to the channel in some cases.

Figure 6:
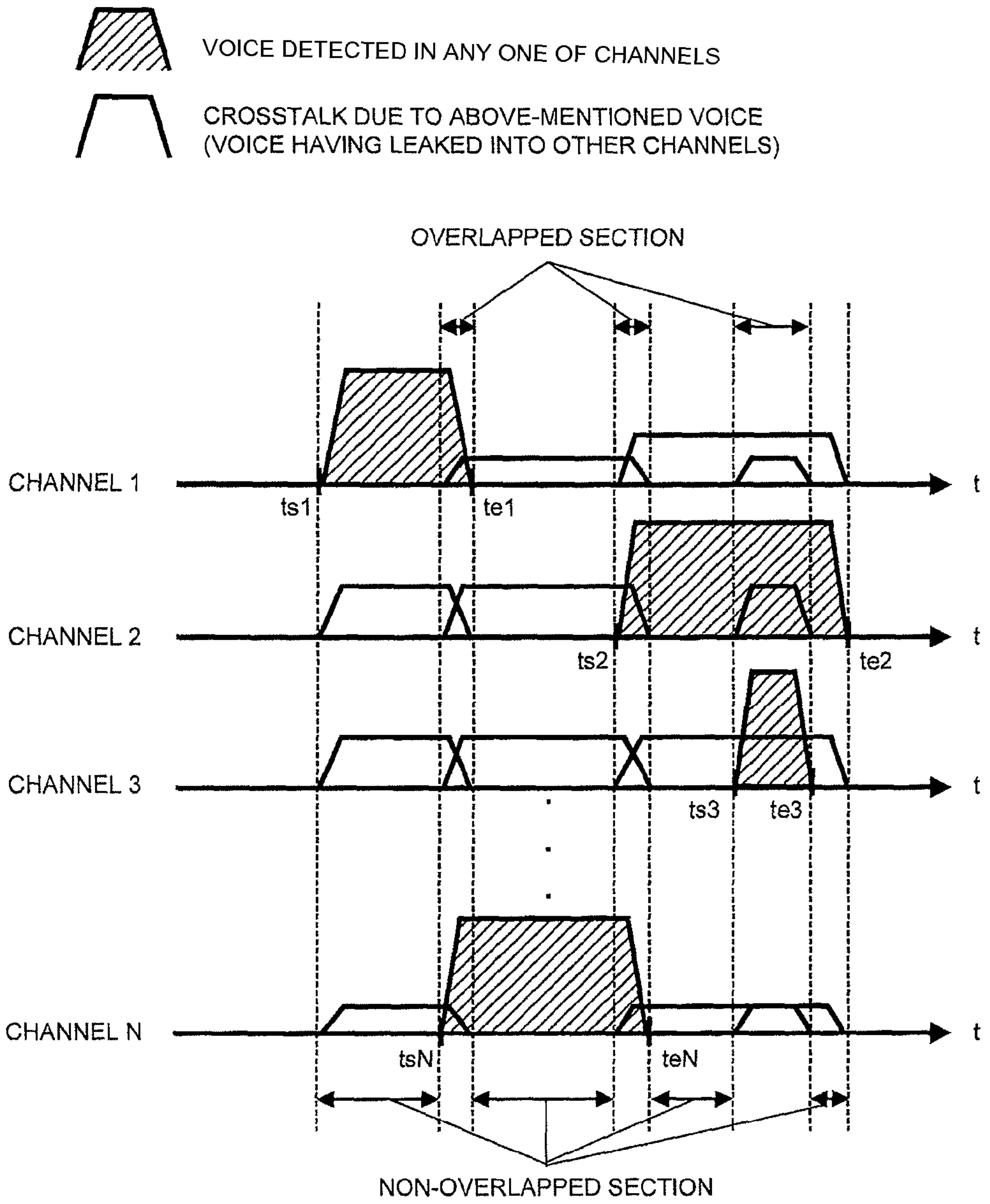
FIG. 6 is a view illustrating the overlapped section that is detected by an overlapped section detector 2.

Next, the overlapped section detector 2 receives time information of the start edges and the end edges of the voice sections detected in the channels 1 to N, and detects the overlapped sections (step S2). The overlapped section, which is a section in which the detected voice sections are overlapped among the channels 1 to N, can be detected from a magnitude relation of ts1, ts2, ts3, . . . , tsN, and te1, te2, te3, . . . , teN as shown in FIG. 6. For example, the section in which the voice section detected in the channel 1 and the voice section detected in the channel N are overlapped is tsN to te1, and this section is the overlapped section. Further, the section in which the voice section detected in the channel 2 and the voice section detected in the channel N are overlapped is ts2 to teN, and this section is the overlapped section. Further, the section in which the voice sections detected in the channel 2 and the voice section detected in the channel 3 are overlapped is ts3 to te3, and this section is the overlapped section.

Next, the feature calculators 3-1 to 3-N calculate the features 1 to N from the input signals 1 to N, respectively (step S3).

$$F1(T)=[\,f11(T)\quad f12(T)\quad \dots\quad f1L(T)\,] \tag{1-1}$$
$$F2(T)=[\,f21(T)\quad f22(T)\quad \dots\quad f2L(T)\,] \tag{1-2}$$
$$\vdots$$
$$FN(T)=[\,fN1(T)\quad fN2(T)\quad \dots\quad fNL(T)\,] \tag{1-N}$$

Where, F1(T) to FN(T) are the features 1 to N calculated from input signals 1 to N, respectively. T is an index of time, and it is assumed that a plurality oft is one section, and T may be used as an index in its time section. As shown in numerical equations (1-1) to (1-N), each of the features F1(T) to FN(T) is configured as a vector having an element of an L-dimensional feature (L is a value equal to or more than 1). As the element of the feature, for example, a time waveform (input signal), a statistics quantity such as an averaged power, a frequency spectrum, a logarithmic spectrum of frequency, a cepstrum, a melcepstrum, a likelihood for a acoustic model, confidence measure (including entropy) for the acoustic model, a phoneme/syllable recognition result, and the like are thinkable.

It can be assumed that not only the features to be directly obtained from the input signals 1 to N, as described above, but also the by-channel value for a certain criteria, being the acoustic model, are the feature, respectively. Additionally, the above-mentioned features are only one example, and needless to say, the other features are also acceptable. Further, while all of the voice sections of a plurality of the channels in which at least the voice has been detected may be employed as the section in which the feature is calculated, the feature can be desirably calculated in the following sections so as to reduce the calculation amount for calculating the feature.

When the feature is calculated with the first channel, it is desirable to employ the following section of (1)+(2)−(3).

(1) The first voice section detected in the first channel.

(2) The n-th voice section of the n-th channel having the overlapped section common to the above first voice section.

(3) The overlapped section with the m-th voice section of the m-th channel other than the first voice section, out of the n-th voice section.

Figure 7:
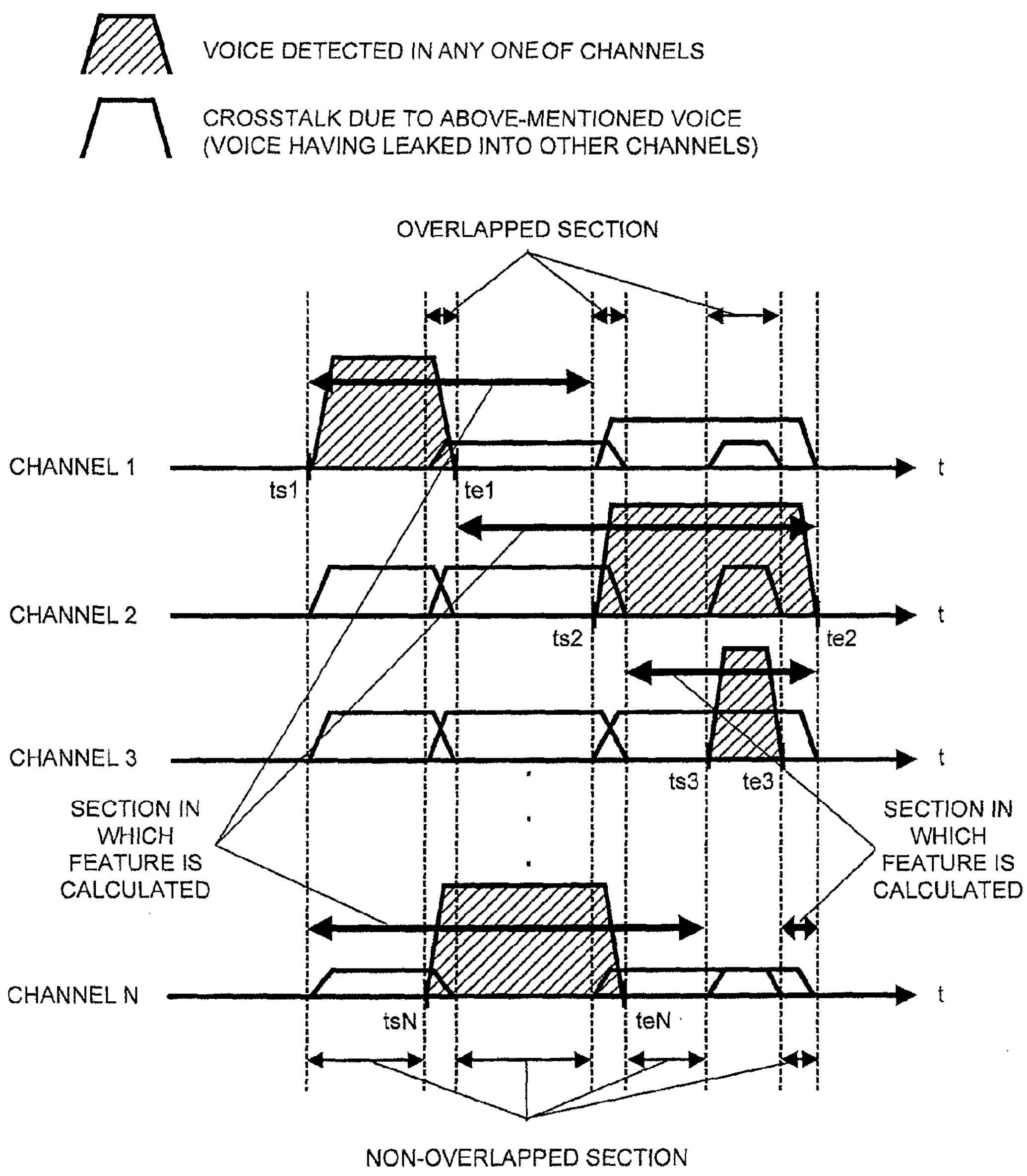
FIG. 7 is a view illustrating the section in which the feature is calculated by feature calculators 3-1 to 3-N.
Figure 8:
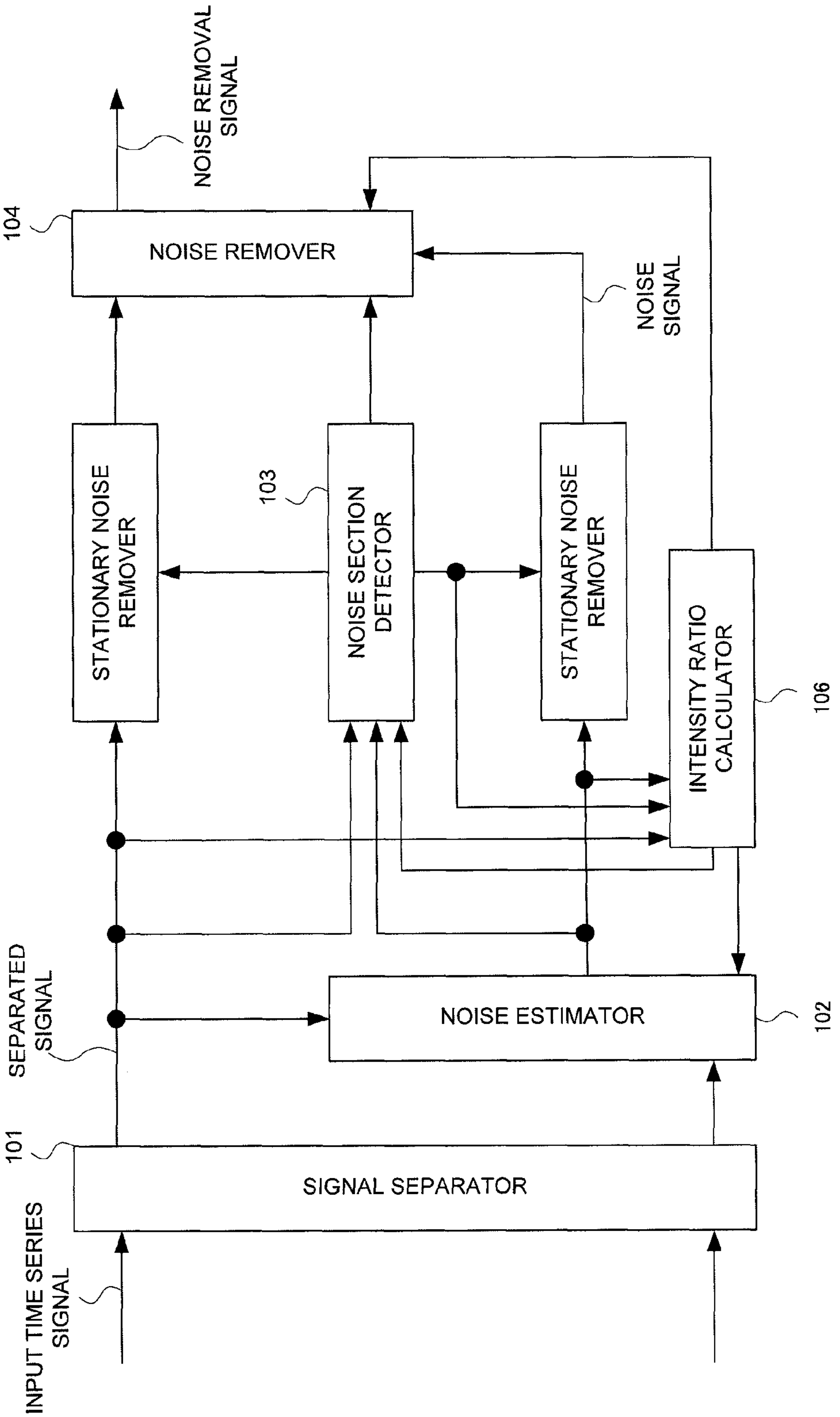
FIG. 8 is a block diagram illustrating a configuration of the related noise removal system.

The above-mentioned sections in which the feature is calculated will be explained by making a reference to FIG. 7 as an example.

<When the Channel 1 is the First Channel>

(1) The voice section of the channel 1=(ts1 to te1).

(2) The voice section of the channel N having the overlapped section common to the voice section of the channel 1=(tsN to teN).

(3) The overlapped section with the voice section of the channel 2 other than the voice section of the channel 1, out of the voice section of the channel N, =(ts2 to teN).

The feature of the section of (1)+(2)−(3)=(ts1 to ts2) is calculated.

<When the Channel 2 is the First Channel>

(1) The voice section of the channel 2=(ts2 to te2).

(2) The voice section of the channel 3 and the voice section of the channel N having the overlapped section common to the voice section of the channel 2=(ts3 to te3 and tsN to teN).

(3) The overlapped section with the voice section of the channel 1 other than the voice section of the channel 2, out of the voice section of the channel 3 and the voice section of the channel N, =(tsN to te1).

The feature of the section of (1)+(2)−(3)=(te1 to te2) is calculated.

<When the Channel 3 is the First Channel>

(1) The voice section of the channel 3=(ts3 to te3).

(2) The voice section of the channel 2 having the overlapped section common to the voice section of the channel 3=(ts2 to te2).

(3) The overlapped section with the voice section of the channel N other than the voice section of the channel 3, out of the voice section of the channel 2, =(ts2 to teN). The feature of the section of (1)+(2)−(3)=(teN to te2) is calculated.

<When the Channel N is the First Channel>

(1) The voice section of the channel N=(tsN to teN).

(2) The voice section of the channel 1 and the voice section of the channel 2 having the overlapped section common to the voice section of the channel N=(ts1 to te1 and ts2 to te2).

(3) The overlapped section with the voice section of the channel 3 other than the voice section of the channel N, out of the voice section of the channel 1 and the voice section of the channel 2, =(ts3 to te3).

The feature of the section of (1)+(2)−(3)=(ts1 to ts3 and te3 to te2) is calculated.

Next, the crosstalk quantity estimator 4 estimates magnitude of an influence upon the first voice of the first channel that is exerted by the crosstalk due to the n-th voice of the n-th channel having the overlapped section common to the first voice of the first channel (step S4). The explanation is made with FIG. 7 exemplified. When it is assumed that the first channel is the channel 1, the crosstalk quantity estimator 4 estimates magnitude of an influence upon the voice of the channel 1 that is exerted by the crosstalk due to the voice of the channel N having the overlapped section common to the voice (the voice section is ts1 to te1) detected in the channel 1. As an estimation method, the following methods are thinkable.

<Estimation Method 1>

The estimation method 1 compares the feature of the channel 1 with that of the channel N in the section te1 to ts2, being the voice section that does not include the overlapped section. And, it estimates that an influence upon the channel 1 that is exerted by the voice of the channel N is large when the former is close to the latter.

For example, the estimation method 1 compares a power of the channel 1 with that of the channel N in the section te1 to ts2. And, it estimates that an influence upon the channel 1 that is exerted by the voice of the channel N is large when the former is close to the latter. Further, it estimates that an influence upon the channel 1 that is exerted by the voice of the channel N is small when the former is sufficiently larger than the latter. In such a manner, an influence is estimated by obtaining the correlation value of the predetermined features.

<Estimation Method 2>

At first, the estimation method 2 calculates a difference of the feature between the channel 1 and the channel N in the section tsN to te1. Next, it calculates a difference of the feature between the channel 1 and the channel N in the section te1 to ts2, being the voice section that does not include the overlapped section. And, it compares the above-mentioned two differences, and estimates that an influence upon the channel 1 that is exerted by the voice of the channel N is large when a difference between the two differences of the features is small.

<Estimation Method 3>

The estimation method 3 calculates a power ratio of the channel 1 and the channel N in the section ts1 to tsN, being the voice section that does not include the overlapped section. Next, it calculates a power ratio of the channel 1 and the channel N in the section te1 to ts2, being the voice section that does not include the overlapped section. And, it employs the above-mentioned two power ratios, and the power of the channel 1 and the power of the channel N in the section tsN to te1, and calculates a power of the crosstalk due to the voice of the channel 1 and the voice of the channel N in the overlapped section tsN to te1 by solving a simultaneous equation. It estimates that an influence upon the channel 1 that is exerted by the voice of the channel N is large when the power of the voice of the channel 1 and the power of the crosstalk are close to each other.

As described above, the estimation method 3 employs at least the voice section that does not include the overlapped section, and estimates an influence of the crosstalk by use of a ratio based upon the inter-channel features, the correlation value, and the distance value.

Needless to say, the estimation method is not limited to the above-described estimation methods, and the crosstalk quantity estimator 4 may estimate an influence of the crosstalk with the other methods if at least the voice section that does not include the overlapped section is employed. Additionally, it is difficult to estimate magnitude of an influence upon the channel 2 that is exerted by the crosstalk due to the voice of the channel 3 because the voice section of the channel 3 of FIG. 7 is contained in the voice section of the channel 2. When it is difficult to estimate magnitude of an influence in such a manner, a previously decided rule (for example, a rule etc. of determining that an influence is large) is obeyed.

Finally, the crosstalk remover 5 receives the input signals of a plurality of the channels each estimated as the channel that is largely influenced by the crosstalk, and the channel that exerts a large influence as the crosstalk in the crosstalk quantity estimator 4, and removes the crosstalk (step S5). The technique founded upon an independent component analysis, the technique founded upon a mean square error minimization, and the like are appropriately employed for the removal of the crosstalk. Further, with the section in which the crosstalk is removed, it is at least the overlapped section. For example, when the power of the channel 1 and that of the channel N in the section te1 to ts2 are compared with each other, and an influence upon the channel 1 that is exerted by the voice of the channel N is estimated to be large, it is assumed that the overlapped section (tsN to te1), out of the voice section (ts1 to te1) of the channel 1, is the section, being a target of the crosstalk processing due to the channel N, and the other sections are not the section, being a target of the crosstalk processing, and only the voice is removed. Doing so makes it possible to reduce the target of the crosstalk processing, and to alleviate a burden of the processing of the crosstalk.

As described above, this exemplary embodiment detects the overlapped section of the voice sections of a plurality of the talkers, and decides the channel, being a target of the crosstalk removal processing, and the section thereof by employing at least the voice section that does not include the detected overlapped section. In particularly, this exemplary embodiment estimates magnitude of an influence of the crosstalk by employing at least the features of a plurality of the channels in the aforementioned voice section that does not include the overlapped section, and removes the crosstalk of which an influence is large. This makes it possible to omit the calculation for removing the crosstalk of which an influence is small, and to efficiently remove the crosstalk.

Additionally, while in the above-mentioned exemplary embodiment, the explanation was made in such a manner that the section was a section for time, it may be assumed that the section is a section for frequency in some cases, and it may be assumed that the section is a section for time/frequency in some cases. For example, the so-called overlapped section in the case where the section is a section for time/frequency becomes the section in which the voice is overlapped at the identical time and frequency.

Further, while in the above-described exemplary embodiment, the multichannel voice detector 1, the overlapped section detector 2, the feature calculators 3-1 to 3-N, the crosstalk quantity estimator 4, and the crosstalk remover 5 were configured with hardware, one part or an entirety thereof can be also configured with an information processing device that operates under a program.

Further, the content of the above-mentioned exemplary embodiment can be expressed as follows.

(Supplementary note 1) A multichannel acoustic signal processing method of processing input signals of a plurality of channels including voices of a plurality of talkers, comprising:

detecting a voice section for each said talker or for each said channel;

detecting an overlapped section, being a section in which said detected voice sections are overlapped between the channels:

deciding the channel, being a target of crosstalk removal processing, and the section thereof by employing at least the voice section that does not include said detected overlapped section; and removing crosstalk of the section of said channel decided as a target of the crosstalk removal processing.

(Supplementary note 2) A multichannel acoustic signal processing method according to supplementary note 1, comprising:

estimating an influence of the crosstalk by employing at least the voice section that does not include said detected overlapped section; and assuming the channel of which an influence of the crosstalk is large, and the section thereof to be a target of the crosstalk removal processing, respectively.

(Supplementary note 3) A multichannel acoustic signal processing method according to supplementary note 2, comprising determining an influence of the crosstalk by employing at least the input signal of each channel in the voice section that does not include said overlapped section, or a feature that is calculated from the above input signal.

(Supplementary note 4) A multichannel acoustic signal processing method according to supplementary note 3, comprising deciding the section in which said feature is calculated for each said channel by employing the voice section detected in an m-th channel, the voice section of an n-th channel having the overlapped section common to said voice section of the m-th channel, and the overlapped section with the voice sections of the channels other than the voice section of the m-th channel, out of said voice section of the n-th channel.

(Supplementary note 5) A multichannel acoustic signal processing method according to supplementary note 3 or supplementary note 4, wherein said feature includes at least one of a statistics quantity, a time waveform, a frequency spectrum, a logarithmic spectrum of frequency, a cepstrum, a melcepstrum, a likelihood for an acoustic model, a confidence measure for an acoustic model, a phoneme recognition result, and a syllable recognition result.

(Supplementary note 6) A multichannel acoustic signal processing method according to one of supplementary note 2 to supplementary note 5, wherein an index expressive of said influence of the crosstalk includes at least one of a ratio, a correlation value and a distance value.

(Supplementary note 7) A multichannel acoustic signal processing method according to one of supplementary note 1 to supplementary note 6, comprising detecting said by-talker voice section correspondingly to anyone of a plurality of the channels.

(Supplementary note 8) A multichannel acoustic signal processing system for processing input signals of a plurality of channels including voices of a plurality of talkers, comprising:

a voice detector that detects a voice section for each said talker or for each said channel;

an overlapped section detector that detects an overlapped section, being a section in which said detected voice sections are overlapped between the channels:

a crosstalk processing target decider that decides the channel, being a target of crosstalk removal processing, and the section thereof by employing at least the voice section that does not include said detected overlapped section; and a crosstalk remover that removes crosstalk of the section of said channel decided as a target of the crosstalk removal processing.

(Supplementary note 9) A multichannel acoustic signal processing system according to supplementary note 8, wherein said crosstalk processing target decider estimates an influence of the crosstalk by employing at least the voice section that does not include said detected overlapped section, and assumes the channel of which an influence of the crosstalk is large, and the section thereof to be a target of the crosstalk removal processing, respectively.

(Supplementary note 10) A multichannel acoustic signal processing system according to supplementary note 9, wherein said crosstalk processing target decider determines an influence of the crosstalk by employing at least the input signal of each channel in the voice section that does not include said overlapped section, or a feature that is calculated from the above input signal.

(Supplementary note 11) A multichannel acoustic signal processing system according to supplementary note 10, wherein said crosstalk processing target decider decides the section in which said feature is calculated for each said channel by employing the voice section detected in an m-th channel, the voice section of an n-th channel having the overlapped section common to said voice section of the m-th channel, and the overlapped section with the voice sections of the channels other than the voice section of the m-th channel, out of said voice section of the n-th channel.

(Supplementary note 12) A multichannel acoustic signal processing system according to supplementary note 10 or supplementary note 11, wherein said feature includes at least one of a statistics quantity, a time waveform, a frequency spectrum, a logarithmic spectrum of frequency, a cepstrum, a melcepstrum, a likelihood for an acoustic model, a confidence measure for an acoustic model, a phoneme recognition result, and a syllable recognition result.

(Supplementary note 13) A multichannel acoustic signal processing system according to one of supplementary note 9 to supplementary note 12, wherein an index expressive of said influence of the crosstalk includes at least one of a ratio, a correlation value and a distance value.

(Supplementary note 14) A multichannel acoustic signal processing system according to one of supplementary note 8 to supplementary note 13, wherein said voice detector detects said by-talker voice section correspondingly to anyone of a plurality of the channels.

(Supplementary note 15) A program for a multichannel acoustic signal process of processing input signals of a plurality of channels including voices of a plurality of talkers, said program causing an information processing device to execute:

a voice detecting process of detecting a voice section for each said talker or for each said channel;

an overlapped section detecting process of detecting an overlapped section, being a section in which said detected voice sections are overlapped between the channels:

a crosstalk processing target deciding process of deciding the channel, being a target of crosstalk removal processing, and the section thereof by employing at least the voice section that does not include said detected overlapped section; and a crosstalk removing process of removing crosstalk of the section of said channel decided as a target of the crosstalk removal processing.

(Supplementary note 16) A program according to supplementary note 15, wherein said crosstalk processing target deciding process estimates an influence of the crosstalk by employing at least the voice section that does not include said detected overlapped section, and assumes the channel of which an influence of the crosstalk is large, and the section thereof to be a target of the crosstalk removal processing, respectively.

(Supplementary note 17) A program according to supplementary note 16, wherein said crosstalk processing target deciding process determines an influence of the crosstalk by employing at least the input signal of each channel in the voice section that does not include said overlapped section, or a feature that is calculated from the above input signal.

(Supplementary note 18) A program according to supplementary note 17, wherein said crosstalk processing target deciding process decides the section in which said feature is calculated for each said channel by employing the voice section detected in an m-th channel, the voice section of an n-th channel having the overlapped section common to said voice section of the m-th channel, and the overlapped section with the voice sections of the channels other than the voice section of the m-th channel, out of said voice section of the n-th channel.

(Supplementary note 19) A program according to supplementary note 17 or supplementary note 18, wherein said feature includes at least one of a statistics quantity, a time waveform, a frequency spectrum, a logarithmic spectrum of frequency, a cepstrum, a melcepstrum, a likelihood for an acoustic model, a confidence measure for an acoustic model, a phoneme recognition result, and a syllable recognition result.

(Supplementary note 20) A program according to one of supplementary note 16 to supplementary note 19, wherein an index expressive of said influence of the crosstalk includes at least one of a ratio, a correlation value and a distance value.

(Supplementary note 21) A program according to one of supplementary note 16 to supplementary note 20, wherein said voice detecting process detects said by-talker voice section correspondingly to anyone of a plurality of the channels.

Above, although the present invention has been particularly described with reference to the preferred embodiments, it should be readily apparent to those of ordinary skill in the art that the present invention is not always limited to the above-mentioned embodiment, and changes and modifications in the form and details may be made without departing from the spirit and scope of the invention.

This application is based upon and claims the benefit of priority from Japanese patent application No. 2009-031110, filed on Feb. 13, 2009, the disclosure of which is incorporated herein in its entirety by reference.

INDUSTRIAL APPLICABILITY

The present invention may be applied to applications such as a multichannel acoustic signal processing apparatus for separating the mixed acoustic signals of voices and noise of a plurality of talkers observed by a plurality of microphones arbitrarily arranged, and a program for causing a computer to realize a multichannel acoustic signal processing apparatus.

REFERENCE SIGNS LIST

1 multichannel voice detector
2 overlapped section detector
3-1 to 3-N feature calculators
4 crosstalk quantity estimator
5 crosstalk remover

The invention claimed is:

1. A multichannel acoustic signal processing method of processing input signals of a plurality of channels including voices of a plurality of talkers, comprising:

detecting a voice section for each of said plurality of talkers or for each of said plurality of channels;

detecting an overlapped section, being a section in which said detected voice sections are overlapped between the channels;

deciding the channel, being a target of crosstalk removal processing, and a section thereof from all of said plurality of channels by employing signals of a section, other than an overlapped section between two channels having a common overlapped section therebetween that does not include the overlapped section of either one of the two channels; and removing crosstalk of the section of said channel decided as a target of the crosstalk removal processing.

2. A multichannel acoustic signal processing method according to claim 1, comprising:

estimating an influence of the crosstalk by employing at least the voice section that does not include said detected overlapped section; and assuming the channel of which an influence of the crosstalk is large, and the section thereof, to be a target of the crosstalk removal processing, respectively.

3. A multichannel acoustic signal processing method according to claim 2, comprising determining an influence of the crosstalk by employing at least the input signal of each channel in the voice section that does not include said overlapped section, or a feature that is calculated from the above input signal.

4. A multichannel acoustic signal processing method according to claim 3, comprising deciding the section in which said feature is calculated for each said channel by employing the voice section detected in an m-th channel, the voice section of an n-th channel having the overlapped section common to said voice section of the m-th channel, and the overlapped section with the voice sections of the channels other than the voice section of the m-th channel, out of said voice section of the n-th channel.

5. A multichannel acoustic signal processing method according to claim 3, wherein said feature includes at least one of a statistics quantity, a time waveform, a frequency spectrum, a logarithmic spectrum of frequency, a cepstrum, a melcepstrum, a likelihood for an acoustic model, a confidence measure for an acoustic model, a phoneme recognition result, and a syllable recognition result.

6. A multichannel acoustic signal processing method according to claim 2, wherein an index expressive of said influence of the crosstalk includes at least one of a ratio, a correlation value and a distance value.

7. A multichannel acoustic signal processing method according to claim 1, comprising detecting said by-talker voice section correspondingly to any one of a plurality of the channels.

8. A multichannel acoustic signal processing system for processing input signals of a plurality of channels including voices of a plurality of talkers using at least one hardware configuration, comprising:

a voice detector that detects a voice section for each of said plurality of talkers or for each of said plurality of channels;

an overlapped section detector that detects an overlapped section, being a section in which said detected voice sections are overlapped between the channels;

a crosstalk processing target decider of the at least one hardware configuration that decides the channel, being a target of crosstalk removal processing, and a section thereof from all of said plurality of channels by employing signals of a section, other than an overlapped section between two channels having a common overlapped section therebetween, that does not include the overlapped section of either one of the two channels; and a crosstalk remover that removes crosstalk of the section of said channel decided as a target of the crosstalk removal processing.

9. A multichannel acoustic signal processing system according to claim 8, wherein said crosstalk processing target decider estimates an influence of the crosstalk by employing at least the voice section that does not include said detected overlapped section, and assumes the channel of which an influence of the crosstalk is large, and the section thereof, to be a target of the crosstalk removal processing, respectively.

10. A multichannel acoustic signal processing system according to claim 9, wherein said crosstalk processing target decider determines an influence of the crosstalk by employing at least the input signal of each channel in the voice section that does not include said overlapped section, or a feature that is calculated from the above input signal.

11. A multichannel acoustic signal processing system according to claim 10, wherein said crosstalk processing target decider decides the section in which said feature is calculated for each said channel by employing the voice section detected in an m-th channel, the voice section of an n-th channel having the overlapped section common to said voice section of the m-th channel, and the overlapped section with the voice sections of the channels other than the voice section of the m-th channel, out of said voice section of the n-th channel.

12. A multichannel acoustic signal processing system according to claim 10, wherein said feature includes at least one of a statistics quantity, a time waveform, a frequency spectrum, a logarithmic spectrum of frequency, a cepstrum, a melcepstrum, a likelihood for an acoustic model, a confidence measure for an acoustic model, a phoneme recognition result, and a syllable recognition result.

13. A multichannel acoustic signal processing system according to claim 9, wherein an index expressive of said influence of the crosstalk includes at least one of a ratio, a correlation value and a distance value.

14. A multichannel acoustic signal processing system according to claim 8, wherein said voice detector detects said by-talker voice section correspondingly to anyone of a plurality of the channels.

15. A non-transitory computer readable storage medium storing a program for a multichannel acoustic signal process of processing input signals of a plurality of channels including voices of a plurality of talkers, said program causing an information processing device to execute:

a voice detecting process of detecting a voice section for each of said plurality of talkers or for each of said plurality of channels;

an overlapped section detecting process of detecting an overlapped section, being a section in which said detected voice sections are overlapped between the channels;

a crosstalk processing target deciding process of deciding the channel, being a target of crosstalk removal processing, and a section thereof from all of said plurality of channels by employing signals of a section, other than an overlapped section between two channels having a common overlapped section therebetween, that does not include the overlapped section of either one of the two channels; and a crosstalk removing process of removing crosstalk of the section of said channel decided as a target of the crosstalk removal processing.

16. A non-transitory computer readable storage medium storing a program according to claim 15, wherein said crosstalk processing target deciding process estimates an influence of the crosstalk by employing at least the voice section that does not include said detected overlapped section, and assumes the channel of which an influence of the crosstalk is large, and the section thereof, to be a target of the crosstalk removal processing, respectively.

17. A non-transitory computer readable storage medium storing a program according to claim 16, wherein said crosstalk processing target deciding process determines an influence of the crosstalk by employing at least the input signal of each channel in the voice section that does not include said overlapped section, or a feature that is calculated from the above input signal.

18. A non-transitory computer readable storage medium storing a program according to claim 17, wherein said crosstalk processing target deciding process decides the section in which said feature is calculated for each said channel by employing the voice section detected in an m-th channel, the voice section of an n-th channel having the overlapped section common to said voice section of the m-th channel, and the overlapped section with the voice sections of the channels other than the voice section of the m-th channel, out of said voice section of the n-th channel.

19. A non-transitory computer readable storage medium storing a program according to claim 17, wherein said feature includes at least one of a statistics quantity, a time waveform, a frequency spectrum, a logarithmic spectrum of frequency, a cepstrum, a melcepstrum, a likelihood for an acoustic model, a confidence measure for an acoustic model, a phoneme recognition result, and a syllable recognition result.

20. A non-transitory computer readable storage medium storing a program according to claim 16, wherein an index expressive of said influence of the crosstalk includes at least one of a ratio, a correlation value and a distance value.

21. A non-transitory computer readable storage medium storing a program according to claim 16, wherein said voice detecting process detects said by-talker voice section correspondingly to any one of a plurality of the channels.

* * * * *